United States Patent
Lawrenson et al.

(10) Patent No.: US 10,776,828 B2
(45) Date of Patent: Sep. 15, 2020

(54) SYSTEM AND METHOD FOR FACILITATING DYNAMIC BRAND PROMOTION USING AUTONOMOUS VEHICLES

(71) Applicant: PANASONIC INTELLECTUAL PROPERTY MANAGEMENT CO., LTD., Osaka (JP)

(72) Inventors: Matthew John Lawrenson, Lausanne (CH); Julian Charles Nolan, Lausanne (CH)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 266 days.

(21) Appl. No.: 16/021,996

(22) Filed: Jun. 28, 2018

(65) Prior Publication Data

US 2019/0012704 A1  Jan. 10, 2019

Related U.S. Application Data

(60) Provisional application No. 62/528,729, filed on Jul. 5, 2017.

(51) Int. Cl.
*G06Q 30/00* (2012.01)
*G06Q 30/02* (2012.01)
(Continued)

(52) U.S. Cl.
CPC ......... *G06Q 30/0266* (2013.01); *G01C 21/28* (2013.01); *G01C 21/3691* (2013.01);
(Continued)

(58) Field of Classification Search
None
See application file for complete search history.

(56) References Cited

U.S. PATENT DOCUMENTS 8,630,897 B1\* 1/2014 Prada Gomez ........ G06Q 30/02
705/14.11
9,373,149 B2\* 6/2016 Abhyanker ............ G06Q 50/28
(Continued)

OTHER PUBLICATIONS

International Search Report (PCT/ISA/210) issued for International Patent Application No. PCT/JP2018/025610 dated Oct. 5, 2018.
(Continued)

*Primary Examiner* — Matthew T Sittner
(74) *Attorney, Agent, or Firm* — Greenblum & Bernstein, P.L.C.

(57) ABSTRACT

A method for facilitating a promotion using autonomous vehicles is provided. The method includes extracting requirements for a promotion activity, collecting first sensor data of the promotion activity on a route of a first autonomous vehicle, and determining whether the promotion activity for which the first sensor data is collected is a valid promotion opportunity. If the promotion activity is determined to be the valid promotion opportunity, when a second autonomous vehicle is determined to be traveling on a route passing by a location of the promotion activity, collecting second sensor data of the promotion activity, and determining, based on the second sensor data and the details of the valid promotion opportunity, whether the second sensor data corresponds to the valid promotion opportunity. When the second sensor data is determined to correspond to the valid promotion opportunity, a promotion is provided to a user interface of the second autonomous vehicle.

20 Claims, 7 Drawing Sheets

(51) Int. Cl.
*G01C 21/36* (2006.01)
*G01C 21/28* (2006.01)

(52) U.S. Cl.
CPC ......... *G01C 21/3697* (2013.01); *G06Q 30/02* (2013.01); *G06Q 30/0242* (2013.01); *G06Q 30/0252* (2013.01); *G06Q 30/0265* (2013.01); *G06Q 30/0271* (2013.01)

(56) References Cited

U.S. PATENT DOCUMENTS

| | | | | |
|---|---|---|---|---|
| 2014/0136414 | A1* | 5/2014 | Abhyanker | ............ G05D 1/024 |
| | | | | 705/44 |
| 2015/0348112 | A1* | 12/2015 | Ramanujam | ....... G06Q 30/0266 |
| | | | | 705/14.63 |
| 2015/0356665 | A1* | 12/2015 | Colson | ............... G06Q 30/0635 |
| | | | | 705/26.81 |
| 2017/0302362 | A1* | 10/2017 | High | .................... H04L 67/306 |
| 2017/0329329 | A1* | 11/2017 | Kamhi | ............... G06K 9/00604 |
| 2018/0281657 | A1* | 10/2018 | Healey | ................. G05D 1/0234 |
| 2018/0300746 | A1* | 10/2018 | Terzian | .............. G06Q 30/0242 |

OTHER PUBLICATIONS

Written Opinion of the International Searching Authority (PCT-ISA-237) issued for International Patent Application No. PCT/JP2018/025610 dated Oct. 5, 2018.

* cited by examiner

SYSTEM AND METHOD FOR FACILITATING DYNAMIC BRAND PROMOTION USING AUTONOMOUS VEHICLES

CROSS-REFERENCE TO RELATED APPLICATION(S)

The present application claims the benefit of U.S. Provisional Patent Application No. 62/528,729 filed on Jul. 5, 2017. The entire disclosure of the above-identified application, including the specifications, drawings and/or claims, is incorporated herein by reference in its entirety.

BACKGROUND

1. Field of the Disclosure

The present disclosure relates to facilitating dynamic brand promotion. More particularly, the present disclosure relates to facilitating monitoring and validating promotion activities of promotion participants using a system of autonomous vehicles.

2. Background Information

A. Autonomous Vehicles

An autonomous vehicle (AV) is a vehicle capable of sensing its location, details of its surrounding environment and navigating along a route without needing a human driver.

In order to achieve this, a computer collects data from sensors, and then executes algorithms in order to decide how the vehicle should be controlled, which direction to take, what speed, when and how to avoid obstacles and the like.

As well as participating in the operation of the autonomous vehicle, such sensors may be leveraged for performing other tasks. For example, image sensors may be used to capture photographs and video, which can then be analysed/used in a variety of non-driving applications.

Autonomous vehicles are also likely to have communication capabilities, and also significant processing power. However, the primary purpose of such technologies is the operation of the vehicle.

B. Transparent Displays

Various companies, including Panasonic®, are developing transparent displays. Transparent displays allow a user to see both (i) graphics rendered on the display and (ii) a scene present behind the display. Such displays could be incorporated into autonomous vehicle's windows. Such displays have obvious applications in augmented reality, whereby real life scenes are augmented with additional data/graphics.

The window of a vehicle provides a possible application scenario for transparent displays as passengers could view the scene outside the vehicle, yet have additional information conveyed via the transparent display enabled window. For example, tourist information about a passing building or sales information about a passing store may be displayed.

C. Object/Action Detection

Imaging sensors can be used to identify objects within their field of view. The use of image sensors in object recognition has become particularly powerful due to the development of machine learning algorithms able to identify objects in images or video with a high degree of accuracy. Example projects include those from Google®, MIT, Berkeley and Microsoft®. Similar techniques can also be used to identify actions within video.

D. Brand Promotion

For many years celebrity endorsement has been a popular way to promote goods or services. This may include celebrities appearing in advertisements, or perhaps becoming ambassadors for a certain brand or product. Typically, celebrities, sports stars or famous people from public life were used, as they are recognisable to a large amount of people.

More recently, however, the nature of fame has changed and internet services such as YouTube®, Instagram® and Snapchat® have introduced a new category of endorsement, whereby certain people within a network use become influencers and are able to earn money by using various products or services.

The use of the internet allows both, a way to present the promotion (for example a person wearing certain clothing in a photograph), and a way to create and track and interaction with potential customers, for example an advertisement placed over the photograph inviting the user to click and obtain further information.

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
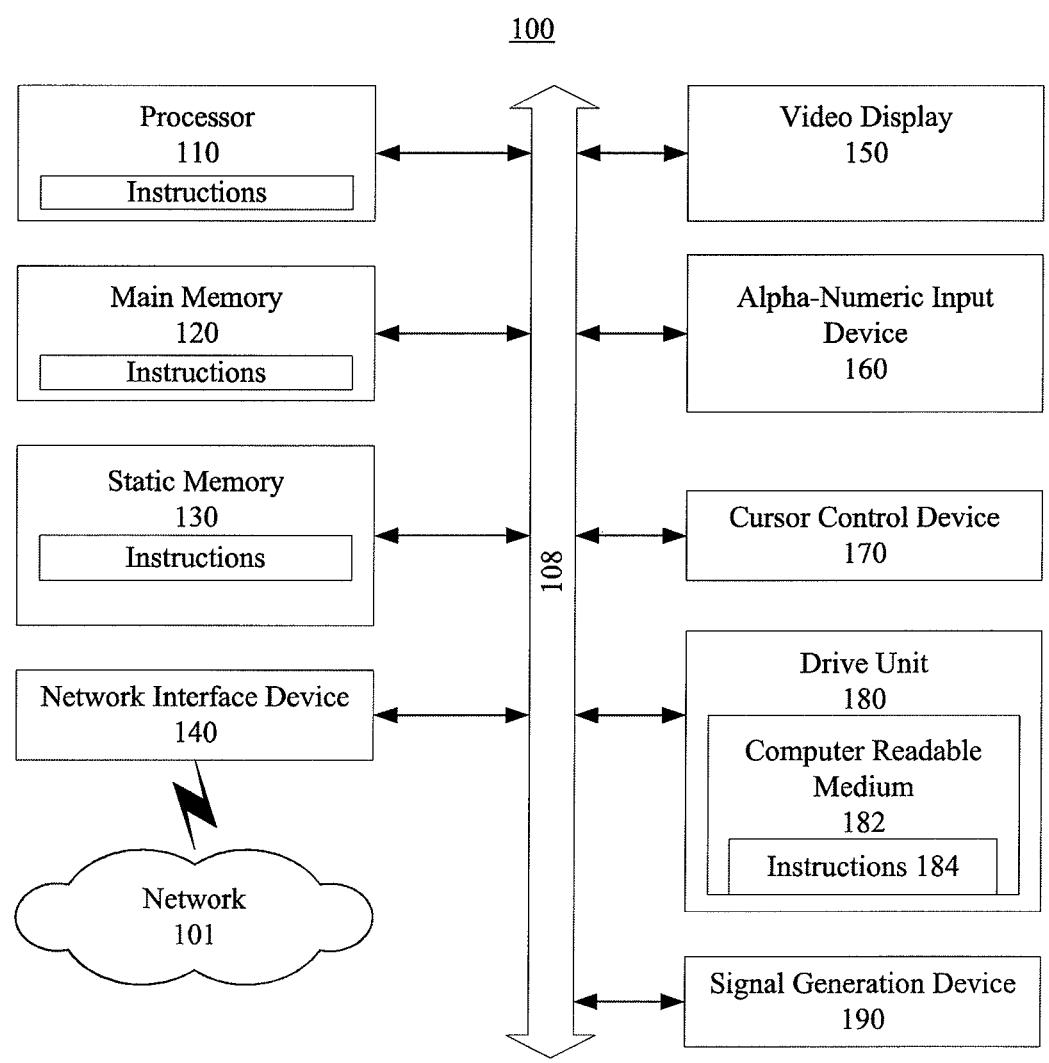
FIG. 1 shows an exemplary general computer system that is configured to facilitate dynamic brand promotion, according to an aspect of the present disclosure.

FIG. 1 shows an exemplary general computer system configured to facilitate dynamic brand promotion according to an aspect of the present disclosure.

A computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as a stationary computer, a mobile computer, a personal computer (PC), a laptop computer, a tablet computer, a wireless smart phone, a set-top box (STB), a personal digital assistant (PDA), a communications device, a control system, a web appliance, a network router, switch or bridge, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

Figure 2:
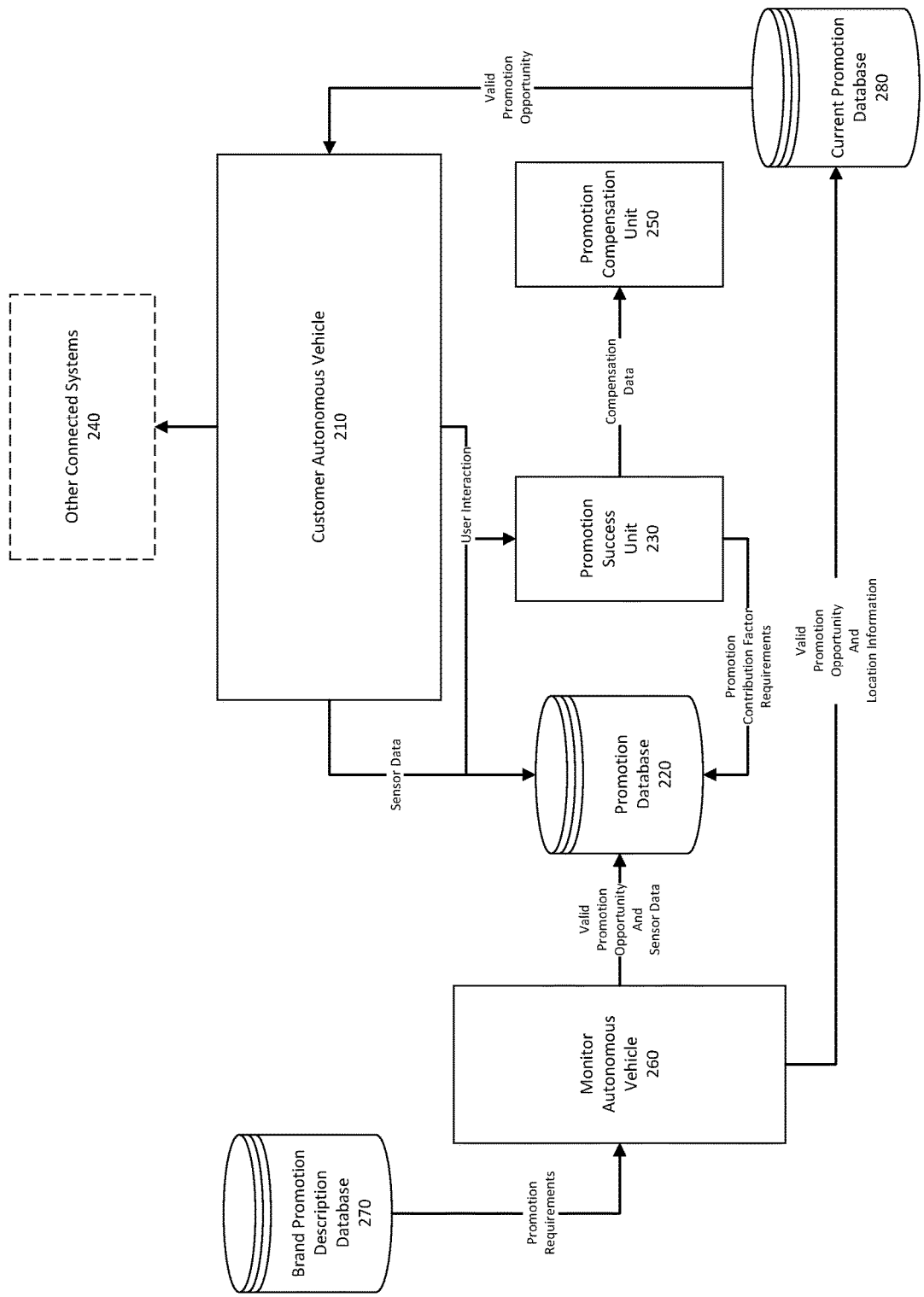
FIG. 2 shows an exemplary system for facilitating dynamic brand promotion, according to an aspect of the present disclosure.

FIG. 2 shows an exemplary system for facilitating dynamic brand promotion, according to an aspect of the present disclosure.

With gaining popularity of social media and rise of social media influencers, such as YouTube® stars, local shops, local individuals or street performers, advertisers or sponsors of advertisement may be more interested in leveraging these individuals or facilities, as promotion participants, to increase advertisement. In an example, the promotion participant may be a person responsible for execution of a promotion opportunity (e.g., actual performer or a manager of a shop or person).

Further, to increase impact of advertisements, the advertisers or sponsors of advertisements may be more interested in performing certain advertising activities or performance in a live setting (e.g., street performance). For example, promotion activities carried out by a promotion participant may include, without limitation, walking along a certain street or area, standing in a certain location, placing objects in a certain manner in a window, creation of a scene (e.g., a group of people standing together in a particular pattern or manner to depict a particular image), or performing a certain activity (e.g., dancing, singing, drumming, and the like).

In this regard, a specific location or time may not be known long beforehand, such that it may be difficult to plan ahead for verification of dynamically performed activities. Further, because it may be difficult to plan verification or monitoring activities for the dynamically performed activities, a sponsor of a promotion activity may be unable to verify whether the dynamically performed activities are performed to meet a set of promotion attributes specified by the sponsor. For example, the promotion attributes may include, without limitation, a specific item of clothing that is to be worn, a certain hairstyle, a threshold distance (e.g., maximum or minimum) from a certain shop or type of shop, a height of the promotion participant, and hair color of the promotion participant.

A system for facilitating dynamic brand promotion may include a system of autonomous vehicles, servers and databases. More specifically, as illustrated in FIG. 2, an exemplary system for facilitating dynamic brand promotion includes a customer autonomous vehicle 210, a promotion database 220, a promotion success unit 230, other connected systems 240, a promotion compensation unit 250, a monitor autonomous vehicle 260, a brand promotion description database 270, and a current promotion database 280.

The customer autonomous vehicle 210 and the monitor autonomous vehicle 260 may be traveling along a same route but at different time points or may be within a reference distance of one another. Each of the customer autonomous vehicle 210 and the monitor autonomous vehicle 260 may include various sensors that may collect sensor data relating to an area surrounding an autonomous vehicle. According to aspects of the present disclosure, an autonomous vehicle may operate as a customer autonomous vehicle or a monitor autonomous vehicle.

For an autonomous vehicle (AV) to operate properly, the autonomous vehicle may rely on very detailed maps, such as high-definition (HD) maps, and various sensor data collected and analysed in view of the HD maps. The HD maps may collect various data using various autonomous vehicle sensors with respect to its surrounding environment to identify its location and to perform operation of the autonomous vehicle. More specifically, the autonomous vehicle sensors may collect data of surrounding static physical environment, such as nearby buildings, road signs, mile markers and the like, for determining its respective location.

Further, autonomous vehicle sensors may also collect data of nearby moving objects, such as other vehicles, pedestrians, events and the like. Also, the autonomous vehicle sensors may also collect various meteorological data, such as temperature, humidity, precipitation, and the like, as well as environmental information, such as road conditions. The sensors of the autonomous vehicle may include, without limitation, a camera, a microphone, a LIDAR (actuators, a light detection and ranging), RADAR, and meteorological sensor (e.g., temperature sensor, humidity sensor, and the like).

The monitor autonomous vehicle 260 receives a set of promotion requirements for potential promotion opportunities from the brand promotion description database 270. A sponsor may register a promotion description on the brand promotion description database 270, which may specify, at a minimum, a set of promotion attributes or rules that the sponsor required to be met for a promotion activity to be recognized as a valid promotion opportunity. The promotion description may also specify rewards that a promotion participant is to receive in the event the valid promotion opportunity is determined to be a successful promotion. The promotion participant may access the brand promotion description database in order to understand a sponsor's requirements for a promotion, and decide whether the potential promotion rewards are worth attempting to facilitate a promotion.

More specifically, the set of promotion requirements provided by the brand promotion description database 270 may specify a set of rules to be abided by a promotion participant when performing a promotion activity or opportunity, and observable by sensors of the monitor autonomous vehicle 260. For example, the promotion requirements may specify that a promotion item must be visible on the promotion participant, and not be worn with any competing brands. Further, the promotion requirements may specify certain weather or environment conditions to be present when the promotion activity or opportunity is performed by the promotion participant. For example, the promotion requirements may specify certain lighting conditions or weather conditions to be present when the promotion activity or opportunity is performed.

According to aspects of the present disclosure, the monitor autonomous vehicle 260 may include a promotion opportunity assessment algorithm, which may be configured to be executed via a processor. The promotion opportunity assessment algorithm may receive inputs from one or more sensors provided on the monitor autonomous vehicle 260 and execute a set of assessments that check whether the requirements specified or stipulated by an advertiser or a sponsor of the promotion and the promotion actions have been met. In an example, the requirements specified may include various promotion attributes specified for the promotion participant and environment factors to be fulfilled. More specifically, the requirements may specify that a promotion item be visible and worn in a specified manner. Further, the requirements may specify that the weather to be not raining when the promotion activity is performed.

In an example, a sponsor may be an entity paying for the promotion to be performed by the promotion participant. A sponsor may include a goods vendor, service providers or advertising agencies hired by the goods vendors or service providers.

If the monitor autonomous vehicle 260 determines, based on the sensor data collected by its sensors, that the promotion requirements are met by a promotion participant, the monitor autonomous vehicle 260 identify a promotion activity carried out by the promotion participant as a valid promotion opportunity. Further, the monitor autonomous vehicle 260 transmits details of the valid promotion opportunity to both the promotion database 220 and current promotion database 280. More specifically, the monitor autonomous vehicle 260 transmits, to the promotion database 260, details of the valid promotion opportunity and corresponding sensor data observed to assess or determine that the promotion activity is a valid promotion opportunity. Further, the monitor autonomous vehicle 260 may transmit valid promotion opportunity with corresponding location information to the current promotion database 280, such that a customer autonomous vehicle located near a location of the valid promotion opportunity may access the respective valid promotion opportunity stored in the current promotion database 280.

Also, according to aspects of the present disclosure, the customer autonomous vehicle 210 may refer to an autonomous vehicle including a passenger that may be a potential customer. The customer autonomous vehicle 210 may extract or receive details of a valid promotion opportunity that may be performed on a route being travelled by the customer autonomous vehicle 210. In an example, the valid promotion opportunity may be extracted or received based on the location information provided by the monitor autonomous vehicle 260.

The customer autonomous vehicle 210 may collect, using its sensors, sensor data while driving along its route. The customer autonomous vehicle 210 may collect sensor data with respect to the valid promotion opportunity present along its route. Further, the customer autonomous vehicle 210 may assess, based on the sensor data and the received details of the valid promotion opportunity present along its route, that the requirements specified by the sponsor are still being met as initially observed by the monitor autonomous vehicle 260. If the customer autonomous vehicle 210 determines that the requirements specified by the sponsor, as observed by the monitor autonomous vehicle 260, are still being met, then the customer autonomous vehicle 210 may determine the valid promotion opportunity to be an actual promotion opportunity and creates a promotion to be displayed on a user interface (UI) of the customer autonomous vehicle 210.

Also, the customer autonomous vehicle 210 may optionally transmit relevant information of the customer or the customer autonomous vehicle 210 with respect to the valid promotion opportunity to the other connected systems 240. The other connected systems 240 may include various external servers storing additional information. The other connected systems 240 may include, without limitation, third party databases that provide information (i.e., a listing of authorized merchants, promotion expiration date, and the like) to be used within a promotion. Further, the other connected systems 240 may also include a third party system that executes processes, such as mailing lists, adding the customer to an email distribution list. However, aspects of the present disclosure are not limited thereto, such that the other connected systems 240 may include additional servers.

In an example, the UI of the customer autonomous vehicle 210 may include processing and communication capability, similar to that found in a computer or mobile device. In addition, the UI may further include a display and an interaction tracking unit. The display of the UI may be a transparent display, which may (i) allow the user to see through a portion of the transparent display to see the real life scene, and also (ii) see a generated text and/or graphics provided on the screen.

The interaction tracking unit may track interactions between the customer and the UI. Examples of the interaction tracking unit may include, without limitation, touch sensing display that may be configured to detect a location and timing of a user touch, a gesture recognition system (e.g., radar or ultrasound based systems), and a voice recognition system.

If the interaction tracking unit detects, via the UI, a valid user interaction, in response to the provided or displayed promotion, then the promotion may be determined to be successful by the promotion success unit 230. Further, the customer autonomous vehicle 210 may transmit sensor data related to the successful promotion to the promotion database. In an example, the valid user interaction may include, without limitation, a touch detection on a certain section of the display, a customer's gaze at a promoted item for a reference period of time, and a voice response to an audible question.

Once the promotion is determined to be successful, the promotion database 220 may receive promotion contribution factor requirements from the promotion success unit 230. The promotion success unit 230 executes a success assessment algorithm to determine whether the promotion was successful or not. An assessment of promotion success may include, for example, a determination of whether the required promotion contribution factors were collected, and a determination of whether the promotion actions and/or promotion attributes were being carried out satisfactorily above a reference threshold at the time of the actual promotion opportunity. In an example, the promotion contribution factors include, without limitation, (i) images from which people involved in the promotion opportunity can be identified, or other data (e.g. cellular data, location data etc.) from which participants can be identified, (ii) images of the scene during the promotion opportunity, (iii) location data, such as GPS, (iv) time stamp information, and the like. Further, the promotion contribution factors may be labeled with an identifier linking one or more of the promotion contribution factors to the respective promotion.

When the promotion success unit 230 determines that the promotion executed by the promotion participant is successful, the promotion success unit 230 transmits compensation data to the promotion compensation unit 250. The promotion compensation unit 230 may execute a process that provides a reward to the promotion participant that have contributed to a successful promotion.

Figure 3:
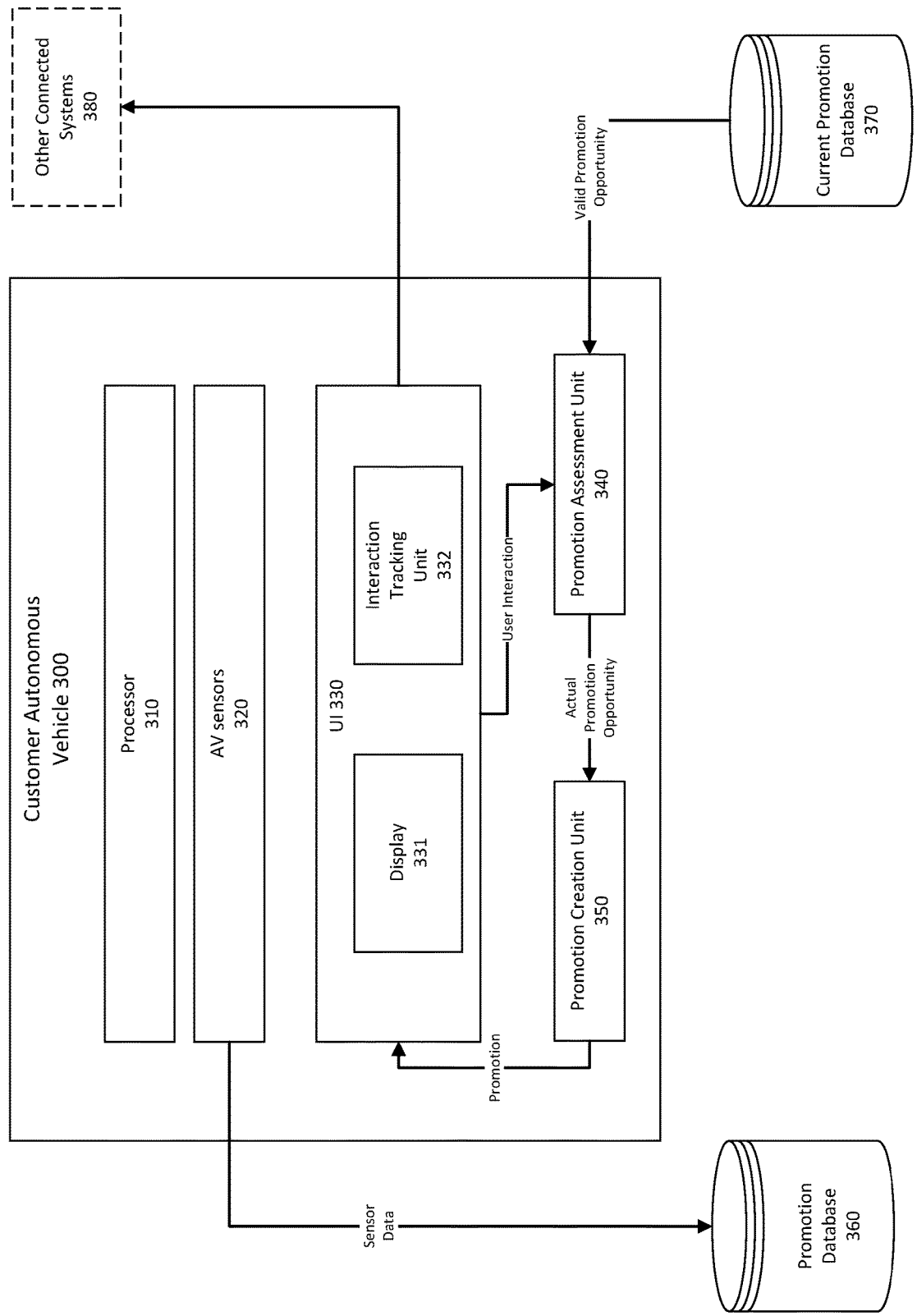
FIG. 3 shows exemplary customer autonomous vehicle, according to an aspect of the present disclosure.

FIG. 3 shows exemplary customer autonomous vehicle, according to an aspect of the present disclosure.

According to aspects of the present disclosure, the customer autonomous vehicle 300 may refer to an autonomous vehicle including a passenger that may be a potential customer for whom a promotion is created. The customer autonomous vehicle 300 includes a processor 310, autonomous vehicle (AV) sensors 320, a user interface 330, a promotion assessment 340, and a promotion creation unit 350. However, aspects of the present disclosure are not limited thereto, such that additional components may be present. For example, the customer autonomous vehicle may include a transmitter and a receiver for transmitting and receiving information to and from external sources, and various components of the monitor autonomous vehicle as exemplarily illustrated in FIG. 4. At least one of the promotion creation unit 340 and the promotion assessment unit 350 may be implemented as a computer, an integrated circuit or a combination of a processor and memory.

Further, the customer autonomous vehicle 300 may further interact (directly or indirectly) with various servers or components via a network for transmitting and/or receiving/extracting relevant information. More specifically, the various servers or components include, without limitation, a promotion database 360, a current promotion database 370, and other connected systems 380.

The promotion database 360 may store information relating to previous promotions as well as current promotions. The promotion database 360 may store details of a promotion including, without limitation, a location of a promotion, a promotion description, a promotion item, promotion actions, promotion attributes, promotion contribution factors, a promotion participant, promotion rewards, and advertiser/sponsor.

In an example, the promotion description may include a description of a promotion opportunity or promotion activities that an advertiser or a sponsor would like to take place. The promotion description may also include attributes required for the promotion to be valid or promotion attributes. A promotion participant may select a promotion opportunity to perform based on the description of the promotion opportunity. The promotion activities may include, without limitation, walking along a certain street or area, standing in a certain location, placing objects in a certain manner in a window, creation of a scene (e.g., a group of people standing together in a particular pattern or manner to depict a particular image), or a proving a particular performance (e.g., singing, dancing, playing a musical instrument, and the like). The promotion attributes may refer to a set of rules that the promotion opportunity must abide by for the sponsor or the advertiser to approve the promotion for compensating the promotion participant. In an example, the promotion attributes may include, without limitation, a specific item of clothing that is to be worn, a certain hairstyle, a threshold distance (e.g., maximum or minimum) from a certain shop or type of shop, a height of the promotion participant, and hair color of the promotion participant.

The current promotion database 370 may store various details, including location information, of current valid promotion opportunities.

The other connected systems 380 may include various external servers storing additional information. The other connected systems 380 may include, without limitation, third party databases that provide information (i.e., a listing of authorized merchants, promotion expiration date, and the like) to be used within a promotion. Further, the other connected systems 380 may also include a third party system that executes processes, such as mailing lists, adding the customer to an email distribution list. However, aspects of the present disclosure are not limited thereto, such that the other connected systems 380 may include additional servers.

The AV sensors 320 may include, without limitation, a camera for capturing image data, a microphone for capturing audio data, a LIDAR (actuators, a light detection and ranging) for capturing 3D object data and/or motion data, a RADAR for capturing motion data, one or more meteorological sensors (e.g., temperature sensor, humidity sensor, and the like). The AV sensors 330 may transmit captured sensor data to the promotion database 360.

The customer autonomous vehicle 300 may include a user interface (UI) 330 with which the customer can interact. The UI 330 includes processing and communication capability, similar to that found in a computer or mobile device. The UI 330 further includes a display 331 and an interaction tracking unit 332. The display 331 may be a transparent display, and the interaction tracking unit 332 may be a circuitry that detects an action (e.g., touch, gesture, voice, and the like) by the customer or passenger of the customer autonomous vehicle 300.

The transparent display 331 may be a display that (i) allows the user to see through a portion of the transparent display to see the real life scene, and also (ii) see a generated text and/or graphics provided on the screen.

The interaction tracking unit 332 may track interactions between the customer and the UI 330. Examples of the interaction tracking unit may include, without limitation, touch sensing display that may be configured to detect a location and timing of a user touch, a gesture recognition system (e.g., radar or ultrasound based systems), and a voice recognition system.

The promotion assessment unit 340 may receive or extract valid promotion opportunities with respect to a location. The promotion assessment unit 340 may detect an occurrence of an actual promotion opportunity among the valid promotion opportunities. In an example, the promotion opportunity is an event that contains a promotion to be performed by the promotion participant. The promotion opportunity may include multiple stages, which may include, without limitation, (i) a potential promotion opportunity, (ii) a valid promotion opportunity, and (iii) an actual promotion opportunity. The potential promotion opportunity refers to an opportunity where a promotion action or activity is undertaken, but its status has not been validated by a monitor autonomous vehicle. The valid promotion opportunity refers to an opportunity where the promotion action or activity is being undertaken and where its status has been validated by the monitor autonomous vehicle. Also, the action promotion opportunity refers to an opportunity where the promotion action or activity is being undertaken, its status has been verified by the monitor autonomous vehicle, and a promoted item can be viewed by the passenger of the customer autonomous vehicle 300 in a way that allows a promotion to be created.

In an example, the promoted item may include a good or physical representation of a good or service (e.g., logo, advert, and the like) that may be presented to the customer or passenger in the customer autonomous vehicle.

The promotion assessment unit 340 may use one or more sensors for detecting facial or object recognition (i.e., a camera and facial/object recognition algorithms). The one or more sensors may identify a person or object known to be participating in a promotion opportunity. In an example, the one or more sensors may include AV sensors 320 or may be separate from the AV sensors 320.

Further, the promotion assessment unit 340 may use an algorithm and the one or more AV sensors 320 may be given a location and understand where that location is with respect to the customer autonomous vehicle's position.

The promotion creation unit 350 may create a promotion based on input provided by the promotion assessment unit 340. In an example, a promotion may refer to a presentation of a good or an item that can be related to a service, to a potential customer, in a manner that allows the customer to interact with the display to register a request (e.g., click on an image). Where the customer interacts with the promotion in a positive manner, the promotion may be identified as a successful promotion. The promotion creation unit 350 may understand a location of the promoted item with respect to the customer and the display 331 of the customer autonomous vehicle 300. The promotion creation unit 350 may access various required components of a promotion (e.g., text, graphics, user interaction elements and the like). Such components may be stored in a local database, or accessed via a remote server. Also, the promotion creation unit 350 may create a rendering on the display to communicate information to the customer for receiving feedback.

Figure 4:
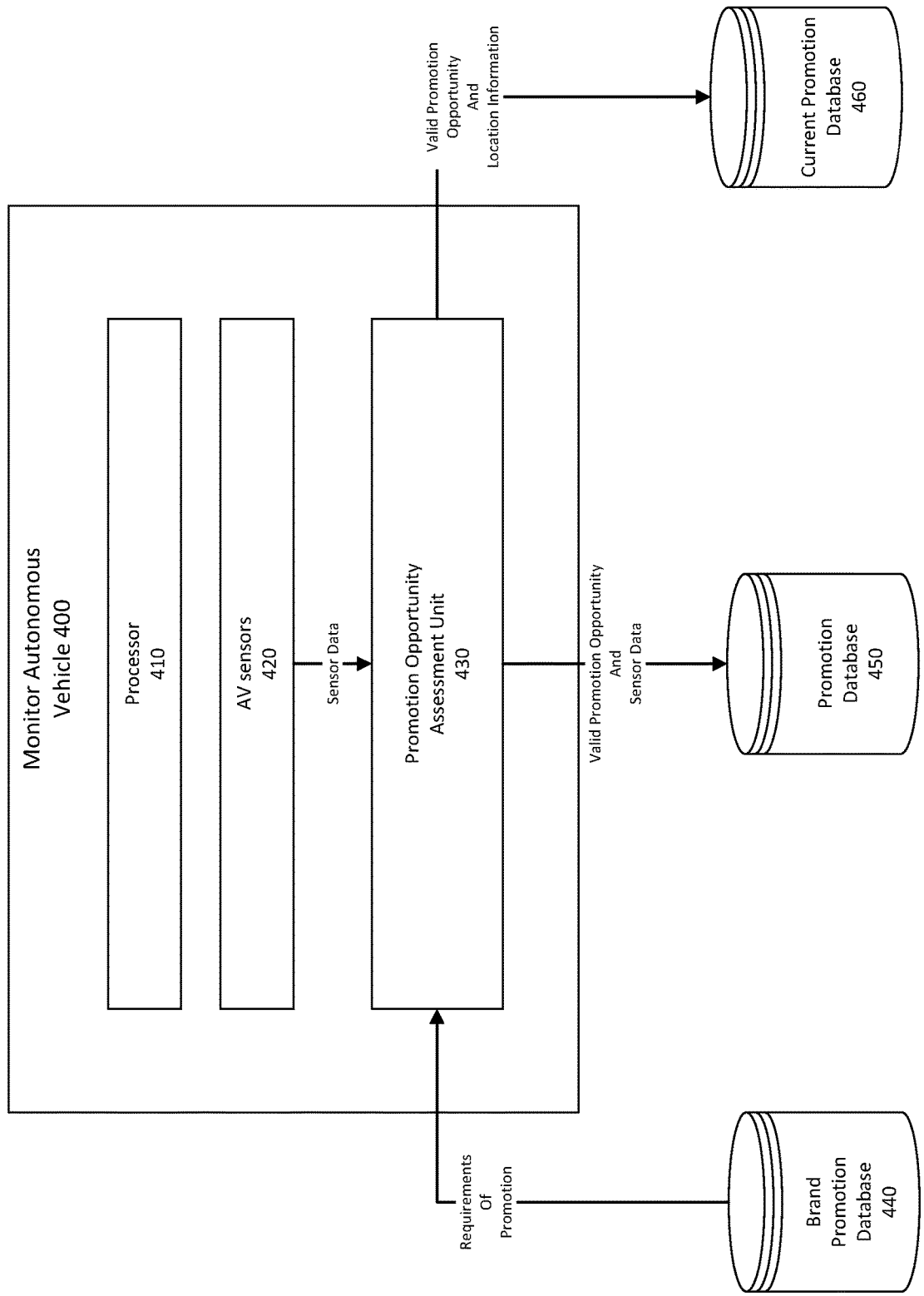
FIG. 4 shows an exemplary monitor autonomous vehicle, according to an aspect of the present disclosure.

FIG. 4 shows an exemplary monitor autonomous vehicle, according to an aspect of the present disclosure.

The monitor autonomous vehicle of FIG. 4 includes a processor 410, autonomous vehicle (AV) sensors 420, and a promotion opportunity assessment unit 430. However, aspects of the present disclosure are not limited thereto, such that additional components may be present. For example, the monitor autonomous vehicle may include a transmitter and a receiver for transmitting and receiving information to and from external sources, and various components of the customer autonomous vehicle as exemplarily illustrated in FIG. 3. In an example, the promotion opportunity assessment unit 430 may be implemented as a computer, an integrated circuit or a combination of a processor and memory.

Further, the monitor autonomous vehicle 400 may further interact (directly or indirectly) with various servers or components via a network for transmitting and/or receiving/ extracting relevant information. More specifically, the various servers or components include, without limitation, a brand promotion database 440, a promotion database 450, and a current promotion database 460.

The brand promotion description database 440 may store a description of goals of a sponsor for a promotion to be executed. In an example, the brand promotion description database 440 may include, without limitation, descriptions of promotion actions or activities, promotion attributes, and promotion rewards. The promotion actions or activities may include one or more activities that are to be carried out by the promotion participant in a promotion opportunity. For examples, the promotion actions or activities include, without limitation, walking along a certain street or area, standing in a certain location, placing objects in a certain manner in a window, creation of a scene (e.g., a group of people standing together in a particular pattern or manner to depict a particular image) or a particular performance (e.g., singing, dancing, playing a musical instrument and the like). The promotion attributes may refer to a set of rules that the promotion opportunity must abide by for the sponsor or the advertiser to approve the promotion for compensating the promotion participant. In an example, the promotion attributes may include, without limitation, a specific item of clothing that is to be worn, a certain hairstyle, a threshold distance (e.g., maximum or minimum) from a certain shop or type of shop, a height of the promotion participant, and hair color of the promotion participant. The promotion rewards may refer to a reward given to the promotion participant as a result of the promotion participant supporting the promotion opportunity. In an example, the reward may be financial reward, points reward, coupon reward, or recognition reward.

The promotion database 450 may store information relating to previous promotions as well as current promotions. The promotion database 450 may store details of a promotion including, without limitation, a location of a promotion, a promotion description, a promotion item, promotion actions, promotion attributes, promotion contribution factors, a promotion participant, promotion rewards, and advertiser/sponsor.

In an example, the promotion description may include a description of a promotion opportunity or promotion activities that an advertiser or a sponsor would like to take place. The promotion description may also include attributes required for the promotion to be valid or promotion attributes. A promotion participant may select a promotion opportunity to perform based on the description of the promotion opportunity. The promotion activities may include, without limitation, walking along a certain street or area, standing in a certain location, placing objects in a certain manner in a window, creation of a scene (e.g., a group of people standing together in a particular pattern or manner to depict a particular image). The promotion attributes may refer to a set of rules that the promotion opportunity must abide by for the sponsor or the advertiser to approve the promotion for compensating the promotion participant. In an example, the promotion attributes may include, without limitation, a specific item of clothing that is to be worn, a certain hairstyle, a threshold distance (e.g., maximum or minimum) from a certain shop or type of shop, a height of the promotion participant, and hair color of the promotion participant.

The current promotion database 460 may store various details, including location information, of current valid promotion opportunities.

The AV sensors 420 may include, without limitation, a camera for capturing image data, a microphone for capturing audio data, a LIDAR (actuators, a light detection and ranging) for capturing 3D object data and/or motion data, a RADAR for capturing motion data, one or more meteorological sensors (e.g., temperature sensor, humidity sensor, and the like). The AV sensors 420 may transmit captured sensor data to the promotion opportunity assessment unit 430.

The promotion opportunity assessment unit 430 may receive or extract requirements of a promotion from the brand promotion database 440, and sensor data from the AV sensors 420.

The promotion opportunity assessment unit 430, in view of the received data, may detect an occurrence of a promotion opportunity or activity.

The promotion opportunity may include multiple stages, which may include, without limitation, (i) a potential promotion opportunity, (ii) a valid promotion opportunity, and (iii) an actual promotion opportunity. The potential promotion opportunity refers to an opportunity where a promotion action is undertaken, but its status has not been validated by a monitor autonomous vehicle. The valid promotion opportunity refers to an opportunity where the promotion action is being undertaken and where its status has been validated by the monitor autonomous vehicle. Also, the action promotion opportunity refers to an opportunity where the promotion action or activity is being undertaken, its status has been verified by the monitor autonomous vehicle, and a promoted item can be viewed by the passenger of the customer autonomous vehicle in a way that allows a promotion to be created.

In an example, the promoted item may include a good or physical representation of a good or service (e.g., logo, advert, and the like) that may be presented to the customer or passenger in the customer autonomous vehicle.

The promotion opportunity assessment unit 430 may be able to execute a promotion opportunity assessment algorithm, which directs the promotion opportunity assessment unit 430 to obtain inputs from the AV sensors 420 and execute a set of assessments that check the requirements stipulated in both the promotion actions and the promotion attributes have been met. If the promotion opportunity assessment unit 430 determines, based on the sensor data, that portions of the requirements of the promotion actions and the promotion attributes have been met above a predetermined threshold, then the promotion opportunity may be determined to be valid for further monitoring by the monitor autonomous vehicle 400. In an example, the sensor data may indicate that the promotion opportunity is starting, and once determined to be valid, monitor the promotion being performed to determine a customer's reaction and/or to determine that the promotion opportunity is executed.

Further, once the promotion opportunity assessment unit 430 determines that the valid promotion opportunity has been detected, the promotion opportunity assessment unit 430 may transmit, to the promotion database 450, details of the valid promotion opportunity and corresponding sensor data used to assess or determine that the promotion activity is a valid promotion opportunity.

Also, once the promotion opportunity assessment unit 430 determines that the valid opportunity has been detected, the promotion opportunity assessment unit 430 may transmit details of the valid promotion opportunity and corresponding location information to the current promotion database 460.

Figure 5A:
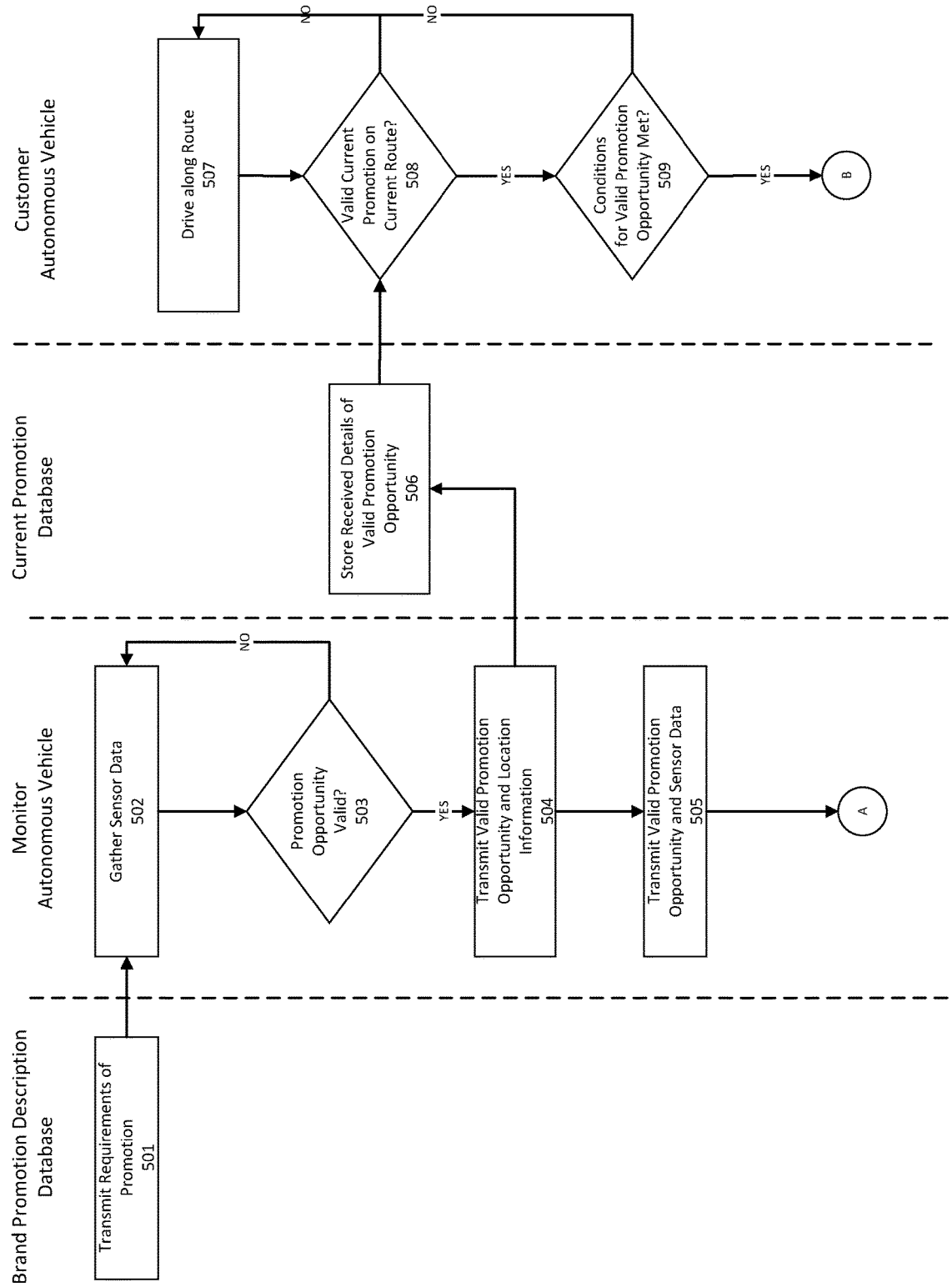
FIGS. 5A-5B shows an exemplary method for facilitating dynamic brand promotion, according to an aspect of the present disclosure.
Figure 5B:
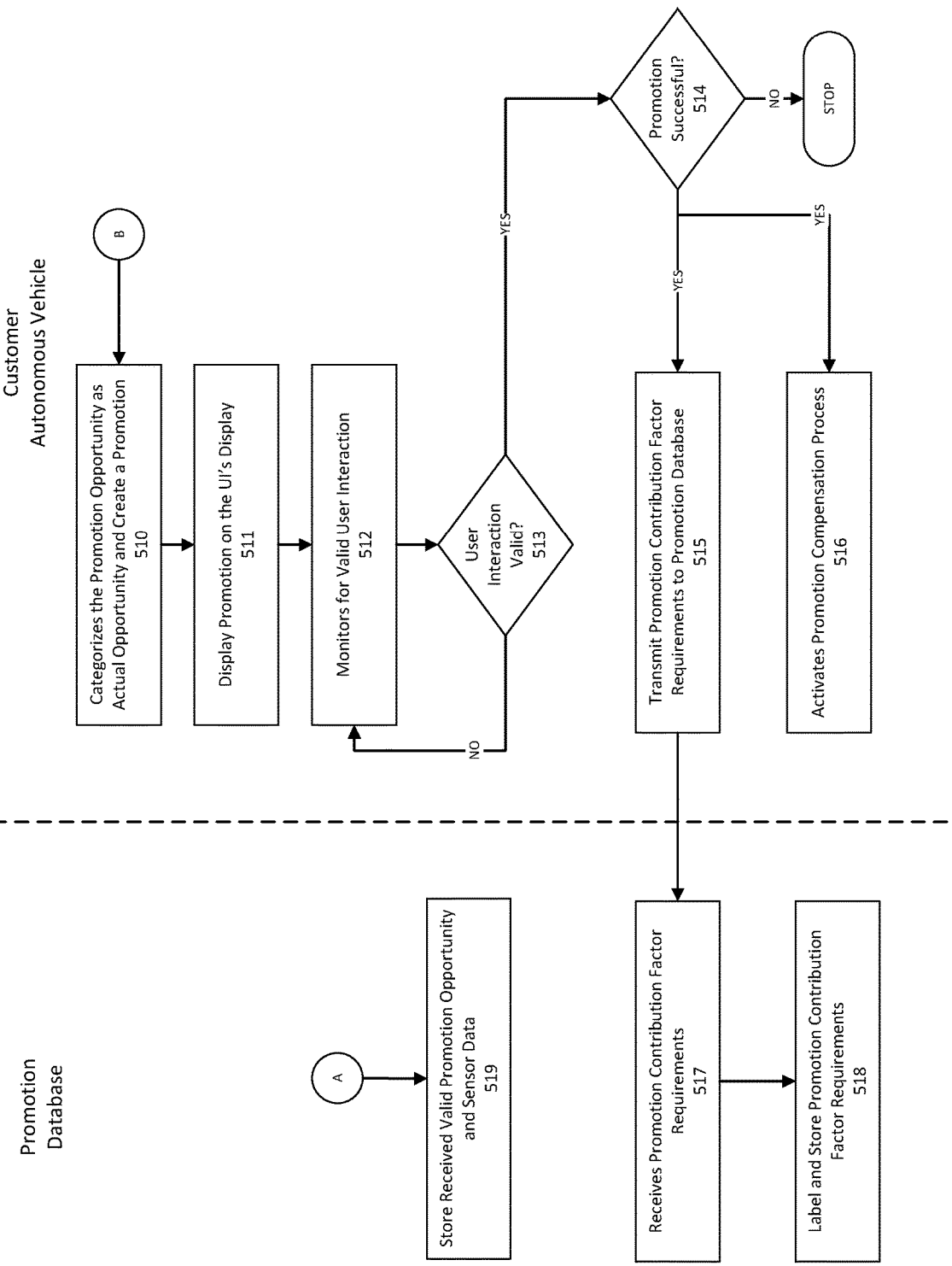

FIGS. 5A-5B shows an exemplary method for facilitating dynamic brand promotion, according to an aspect of the present disclosure.

In operation 501, a brand promotion description database may provide requirements of a promotion to a monitoring autonomous vehicle traveling along a route. A sponsor may register a promotion description on the brand promotion description database, which may specify, at a minimum, a set of promotion attributes or rules that the sponsor required to met for to be recognized as a valid promotion opportunity. The promotion description may also specify rewards that a promotion participant is to receive in the event the valid promotion opportunity is determined to be a successful promotion. The promotion participant may access the brand promotion description database in order to understand a sponsor's requirements for a promotion, and decide whether the potential promotion rewards are worth attempting to facilitate a promotion.

The brand promotion description database may store a description of goals of a sponsor for a promotion to be executed. In an example, the brand promotion description database may include, without limitation, descriptions of promotion actions, promotion attributes, and promotion rewards. The promotion actions may include one or more activities that are to be carried out by the promotion participant in a promotion opportunity. For examples, the promotion actions include, without limitation, walking along a certain street or area, standing in a certain location, placing objects in a certain manner in a window, creation of a scene (e.g., a group of people standing together in a particular pattern or manner to depict a particular image). The promotion attributes may refer to a set of rules that the promotion opportunity must abide by for the sponsor or the advertiser to approve the promotion for compensating the promotion participant. In an example, the promotion attributes may include, without limitation, a specific item of clothing that is to be worn, a certain hairstyle, a threshold distance (e.g., maximum or minimum) from a certain shop or type of shop, a height of the promotion participant, and hair color of the promotion participant. The promotion rewards may refer to a reward given to the promotion participant as a result of the promotion participant supporting the promotion opportunity. In an example, the reward may be financial reward, points reward, coupon reward, or recognition reward.

In operation 502, a monitoring autonomous vehicle gathers sensor data of a promotion activity being performed by a promotion participant while traveling along a route. In an example, the promotion participant may be a person responsible for the execution of the promotion opportunity or activity. The promotion participant may perform the promotion actions or activities themselves, for example walk along the street wearing a certain brand of clothing, or may facilitate the promotion actions, for example allow a window they own to be dressed in a certain manner. The monitoring autonomous vehicle may include multiple sensors, which may collect various sensor data. The multiple sensors may include, without limitation, an image sensor (e.g., a camera), a LiDAR, a Radar, an environmental sensor (e.g., thermometer, barometer and the like), an acoustic sensor and the like.

In operation 503, the monitoring autonomous vehicle determines whether a promotion opportunity or activity is valid.

If the monitoring autonomous vehicle determines that the promotion opportunity or activity is valid in operation 503, the monitoring autonomous vehicle transmits details of valid promotion opportunity and corresponding location information to a current promotion database in operation 504.

Further, in operation 505, the monitoring autonomous vehicle transmits details of the valid promotion opportunity and corresponding sensor data to a promotion database. In an example, the promotion database may be a server connected by a network. In operation 519, the promotion database stores the details of the valid promotion opportunity and the relevant sensor data that were used to assess or determine that the promotion activity is a valid promotion opportunity. The promotion database may further store information relating to historic and current promotions and corresponding sensor data.

If the monitoring autonomous vehicle determines that the promotion opportunity is not valid in operation 503, the monitoring autonomous vehicle gathers additional sensor data.

In operation 506, the current promotion database stores received details of the valid promotion opportunity. In an example, the current promotion database may be a server connected by a network. The current promotion database may store details, including locations, of current valid promotion opportunities.

In operation 507, a customer autonomous vehicle travels along a designated route.

In operation 508, the customer autonomous vehicle determines whether the valid current promotion is on a current route of the customer autonomous vehicle based on the location information of the valid promotion opportunity stored in the current promotion database.

If the customer autonomous vehicle determines that the valid current promotion is not present on the current route in operation 508, the customer autonomous vehicle continues to drive along its route in operation 507.

Alternatively, if the customer autonomous vehicle determines that the valid current promotion is present on the current route in operation 508, the customer autonomous vehicle further determines whether conditions for the promotion opportunity are met in operation 509.

If the conditions for the valid promotion opportunity are not met in operation 509, the customer autonomous vehicle continues to drive along its route in operation 507. In an example, conditions for the promotion opportunity or activity may be stipulated by the sponsor of the promotion. More specifically, a promotion item (e.g., a hat to be worn by a promotion participant) may be identified by the customer autonomous vehicle, and an outline of the promotion item is provided on a display in the customer autonomous vehicle. If a passenger's eyes are directed to the outline or aligned with the outline, then the customer autonomous vehicle may determined that the promotion condition is met.

Alternatively, if the conditions for promotion opportunity is met in operation 509, the customer autonomous vehicle categorizes the promotion opportunity as an actual opportunity and creates a promotion in operation 510.

In operation 511, the customer autonomous vehicle displays the promotion on the user interface (UI)'s display. For example, the UI's display may be a transparent display that allows the user to see the real-life scene (e.g., real-life buildings and roads) through the display, and (ii) see rendered text/graphics on the display.

In operation 512, the customer autonomous vehicle performs monitoring user interaction for detection of a valid user interaction. Examples of technologies that could enable an interaction tracking may include, without limitation, (i) touch sensitivity being integrated into the display, for example a capacitive sensor able to detect when and where the display has been touched, (ii) a gesture recognition system, for example based on radar or ultrasound, and (iii) a voice recognition system able to understand spoken words.

In operation 513, the customer autonomous vehicle determines whether the monitored or detected user interaction is a valid interaction. If the monitored user interaction is determined not to be valid, then user interaction is continued to be monitored in operation 512. If the monitored user interaction is determined to be valid, then the customer autonomous vehicle determines whether the promotion was successful in operation 514.

If the promotion is determined to be successful in operation 514, the customer autonomous vehicle transmits promotion contribution factor requirements to a promotion database in operation 515. In an example, the promotion contribution factors include, without limitation, (i) images from which people involved in the promotion opportunity can be identified, or other data (e.g. cellular data, location data etc.) from which participants can be identified, (ii) images of the scene during the promotion opportunity, (iii) location data, such as GPS, (iv) time stamp information, and the like. Further, the promotion contribution factors may be labeled with an identifier linking one or more of the promotion contribution factors to the respective promotion.

In addition, if the promotion is determined to be successful in operation 514, the customer autonomous vehicle activates a promotion compensation process in operation 516. According to aspects of the present disclosure, many variants of reward processes may be possible. For example, the reward process may include, for example, a financial payment may be made to the Promotion Participant, or some non-financial recognition may be made.

In operation 517, the promotion database receives the promotion contribution factor requirements. Further, operation 518, the promotion database labels and stores the promotion contribution factor requirements.

Figure 6:
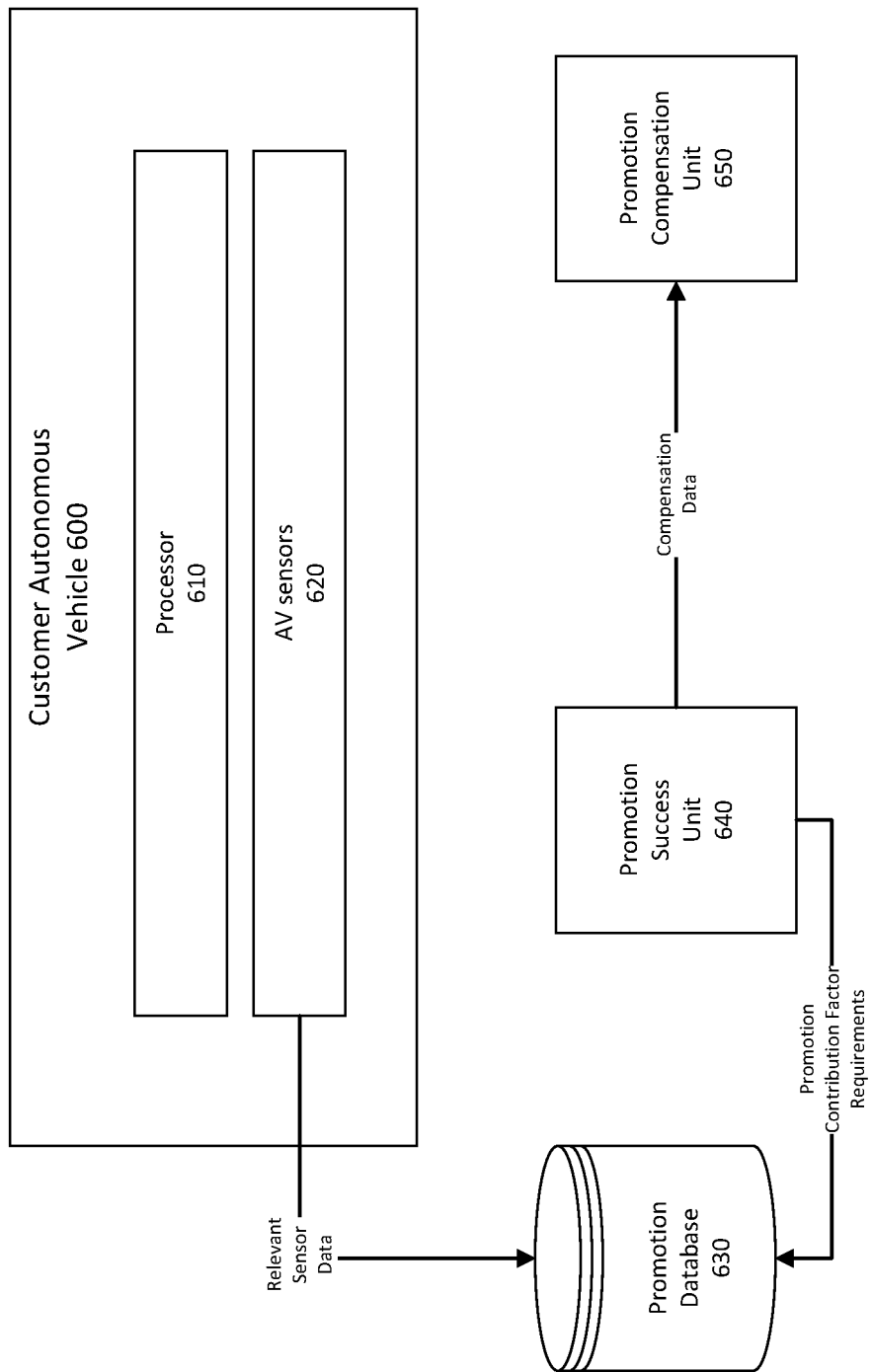
FIG. 6 shows an exemplary system for providing a reward for performing a promotion, according to an aspect of the present disclosure.

FIG. 6 shows an exemplary system for providing a reward for performing a promotion, according to an aspect of the present disclosure.

According to aspects of the present disclosure, an exemplary system for providing a reward for performing a promotion includes a customer autonomous vehicle 600, a promotion database 630, a promotion success unit 640, and a promotion compensation unit 650. At least one of the promotion database 630 and the promotion compensation unit 650 may be implemented as a computer, an integrated circuit or a combination of a processor and memory.

The customer autonomous vehicle 600 may refer to an autonomous vehicle including a passenger that may be a potential customer for whom a promotion is created. The customer autonomous vehicle 600 includes a processor 610, and autonomous vehicle (AV) sensors 620. However, aspects of the present disclosure are not limited thereto, such that additional components may be present. For example, the customer autonomous vehicle may include a transmitter and a receiver for transmitting and receiving information to and from external sources.

Further, the customer autonomous vehicle 600 may further interact (directly or indirectly) with various servers or components via a network for transmitting and/or receiving/extracting relevant information. The customer autonomous vehicle 600 may interact with a promotion database 630. More specifically, the customer autonomous vehicle 600 may transmit, to the promotion database 630, relevant sensor data collected by the AV sensors 620.

Further, the promotion success unit 640 transmits, to the promotion database, promotion contribution factor requirements. The promotion contribution factors may refer to evidence that can be collected to prove which promotion participant contributed to a successful promotion. The promotion success unit 640 may execute a promotion success determination algorithm to determine whether the promotion executed by a promotion participant was successful or not. In an example, the promotion success unit 640 may determine (i) whether an intended outcome of the promotion has been achieved, and (ii) whether the promotion participant(s) can be identified in order to execute the reward process.

When the promotion success unit 640 determines that the promotion executed by the promotion participant is successful, the promotion success unit 640 transmits compensation data to the promotion compensation unit 650. The promotion compensation unit may execute a process that provides a reward to the promotion participant that have contributed to a successful promotion.

According to aspects of the present application, influencers can create live or in-person promotions of brands/goods/services in real-life and in real-time, and (i) allow potential Customers to interact with those Promotions in a trackable way, and which (ii) is able to track the contribution of those influencers and thus enable a process whereby they can be rewarded.

Aspects of the present application provides, generally, facilitation of brand promotion, tracking of user interaction, and distribution of rewards to promotion participants.

The facilitation of brand promotion allows a party (e.g., an individual, group of people, an owner of a facility, such as a shop window) to participate in a brand promotion, whereby they promote items in view of passing autonomous vehicles. The brand promotion may include, for example, (i) wearing particular clothes, carrying fashion accessories etc. in view of passengers of autonomous vehicles, (ii) displaying the results of using a certain product (e.g., showing their hair after using certain hair care beauty products), and (iii) displaying goods in a certain location that can be seen by passengers in an autonomous vehicle, for example in a window. The process also includes steps where autonomous vehicles are used to ensure that the brand promotion takes place in accordance with guidelines stipulated by the brand's owner. This is achieved by having a set of requirements for the promotion, and then sensors within the passing autonomous vehicles check that those requirements are being met. Only if such confirmation is achieved is the brand Promotion considered valid.

The tracking of brand promotion may be achieved by using a user interface within an autonomous vehicle that (i)

allows the passenger to see the promotion (which takes place in the vehicle) and promoted items (outside the vehicle) (ii) is able to display the promotion to a passenger in the vehicle and (iii) is able to determine whether a subsequent action of the passenger is a reaction to the display of the promotion. Sensors and processors within the autonomous vehicle also provide tracking data, such as location, time and the like.

The distribution of reward to promotion participants may track participants providing brand promotion, and the interaction of the customer, it is able to correlate the promotion participants with results, and hence a system may be devised that provides a reward to the promotion participants in the event of a successful outcome.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

As described above, according to an aspect of the present disclosure, a method is provided for facilitating a dynamic promotion activity. The method includes extracting, by a first autonomous vehicle, promotion requirements for a promotion activity; collecting, by the first autonomous vehicle, first sensor data of the promotion activity performed by a promotion participant; determining, by the first autonomous vehicle based on the promotion requirements and the first sensor data, whether the promotion activity is a valid promotion opportunity; transmitting, by the first autonomous vehicle to a current promotion database server, details of the valid promotion opportunity and corresponding location information; obtaining, by a second autonomous vehicle and from the current promotion database server, the details of the valid promotion opportunity; when the second autonomous vehicle is determined to be traveling on a route passing by a location of the promotion activity, collecting, by the second autonomous vehicle, second sensor data of the promotion activity; determining, by the second autonomous vehicle based on the second sensor data and the details of the valid promotion opportunity, whether the second sensor data correspond to the valid promotion opportunity; when the second sensor data are determined to correspond to the valid promotion opportunity, generating, by the second autonomous vehicle, a promotion; and providing, via a user interface of the second autonomous vehicle, the generated promotion.

According to another aspect of the present disclosure, the method further includes receiving, by the user interface of the second autonomous vehicle, a user input; determining, by a promotion success server, whether the received input is a valid user interaction; and determining, by the promotion success server, the promotion activity is a successful promotion if the received input is determined to be the valid user interaction.

According to yet another aspect of the present disclosure, the user interface includes a display configured to display the promotion; and an interaction tracking circuit configured to receive the user input.

According to still another aspect of the present disclosure, the promotion requirements for the promotion activity are specified by a sponsor.

According to another aspect of the present disclosure, the promotion requirements include one or more promotion attributes, and one or more environmental factors.

According to yet another aspect of the present disclosure, the one or more promotion attributes include at least one of a manner of dress by the promotion participant, a number of people in an area at which the promotion activity is to executed, prohibited gestures, and prohibited items.

According to still another aspect of the present disclosure, the one or more environmental factors include at least one of a lighting condition, an air quality condition, a wind condition, and a weather condition.

According to another aspect of the present disclosure, further includes categorizing, by the second autonomous vehicle, the valid promotion opportunity as an actual promotion opportunity when the second sensor data correspond to the valid promotion opportunity.

According to yet another aspect of the present disclosure, the user input includes at least one of a touch input, a voice input, and a gesture.

According to still another aspect of the present disclosure, further includes selecting, by a device of the promotion participant, the promotion activity to be performed among a plurality of promotion activities available for selection.

According to another aspect of the present disclosure, further includes transmitting, by the second autonomous vehicle to a promotion database server, one or more promotion contribution factor requirements; and labeling and storing, in the promotion database server, the one or more promotion contribution factor requirements.

According to yet another aspect of the present disclosure, the promotion activity is determined to be the valid promotion opportunity when the first sensor data corresponds with the promotion requirements for the promotion activity.

According to still another aspect of the present disclosure, at least one of the first and second autonomous vehicles includes: an image sensor, a LIDAR (actuators, a light detection and ranging) sensor, a radar sensor, and a meteorological sensor.

According to still another aspect of the present disclosure, the providing of the generated promotion includes, displaying, on a display of the user interface, the generated promotion.

According to still another aspect of the present disclosure, the display is a transparent display.

According to still another aspect of the present disclosure, the providing of the generated promotion includes, displaying, on a display of the user interface, the generated promotion, and wherein, when the received user input is a movement of eyes of a passenger riding in the second autonomous vehicle to be in alignment with the display of the generated promotion, the promotion success server determines that the promotion activity is the successful promotion.

According to still another aspect of the present disclosure, further includes modifying the route of the second autonomous vehicle to pass by the promotion activity.

According to still another aspect of the present disclosure, further includes transmitting, from the promotion success server to a promotion compensation server, compensation data; and rewarding the promotion participant based on the successful promotion.

According to another aspect of the present disclosure, a non-transitory computer readable storage medium that stores a computer program, the computer program, when executed by a processor, causing a computer apparatus to perform a process is disclosed. The process includes extracting promotion requirements for a promotion activity; collecting first sensor data of the promotion activity performed by a promotion participant on a route of a first autonomous vehicle; determining, based on the promotion requirements and the first sensor data, whether the promotion activity for which the first sensor data is collected is a valid promotion opportunity; transmitting, to a current promotion database server, details of the valid promotion opportunity and corresponding location information; obtaining, from the current promotion database server, the details of the valid promotion opportunity; when a second autonomous vehicle is determined to be traveling on a route passing by a location of the promotion activity, collecting second sensor data of the promotion activity performed by the promotion participant; determining, based on the second sensor data and the details of the valid promotion opportunity, whether the second sensor data corresponds to the valid promotion opportunity; when the second sensor data is determined to correspond to the valid promotion opportunity, generating a promotion; and providing, to a user interface of the second autonomous vehicle, the generated promotion.

According to yet another aspect of the present disclosure, a computer apparatus for facilitating a dynamic promotion activity using autonomous vehicles is provided. The computer apparatus includes a memory that stores instructions, and a processor that executes the instructions, in which, when executed by the processor, the instructions cause the processor to perform a set of operations. The set of operations includes extracting promotion requirements for a promotion activity; collecting first sensor data of the promotion activity performed by a promotion participant on a route of a first autonomous vehicle; determining, based on the promotion requirements and the first sensor data, whether the promotion activity for which the first sensor data is collected is a valid promotion opportunity; transmitting, to a current promotion database server, details of the valid promotion opportunity and corresponding location information; obtaining, from the current promotion database server, the details of the valid promotion opportunity; when a second autonomous vehicle is determined to be traveling on a route passing by a location of the promotion activity, collecting second sensor data of the promotion activity performed by the promotion participant; determining, based on the second sensor data and the details of the valid promotion opportunity, whether the second sensor data corresponds to the valid promotion opportunity; when the second sensor data is determined to correspond to the valid promotion opportunity, generating a promotion; and providing, to a user interface of the second autonomous vehicle, the generated promotion.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating a dynamic promotion activity using autonomous vehicles, the method comprising:
   extracting, by a first autonomous vehicle, promotion requirements for a promotion activity;
   collecting, by the first autonomous vehicle, first sensor data of the promotion activity performed by a promotion participant;

determining, by the first autonomous vehicle based on the promotion requirements and the first sensor data, whether the promotion activity is a valid promotion opportunity;

transmitting, by the first autonomous vehicle to a current promotion database server, details of the valid promotion opportunity and corresponding location information;

obtaining, by a second autonomous vehicle and from the current promotion database server, the details of the valid promotion opportunity;

when the second autonomous vehicle is determined to be traveling on a route passing by a location of the promotion activity, collecting, by the second autonomous vehicle, second sensor data of the promotion activity;

determining, by the second autonomous vehicle based on the second sensor data and the details of the valid promotion opportunity, whether the second sensor data correspond to the valid promotion opportunity;

when the second sensor data are determined to correspond to the valid promotion opportunity, generating, by the second autonomous vehicle, a promotion; and providing, via a user interface of the second autonomous vehicle, the generated promotion.

2. The method of claim 1, further comprising:
receiving, by the user interface of the second autonomous vehicle, a user input;
determining, by a promotion success server, whether the received input is a valid user interaction; and
determining, by the promotion success server, the promotion activity is a successful promotion if the received input is determined to be the valid user interaction.

3. The method of claim 1, wherein the user interface includes
a display configured to display the promotion; and
an interaction tracking circuit configured to receive the user input.

4. The method of claim 1, wherein the promotion requirements for the promotion activity are specified by a sponsor.

5. The method of claim 4, wherein the promotion requirements include one or more promotion attributes, and one or more environmental factors.

6. The method of claim 5, wherein the one or more promotion attributes include at least one of a manner of dress by the promotion participant, a number of people in an area at which the promotion activity is to executed, prohibited gestures, and prohibited items.

7. The method of claim 5, wherein the one or more environmental factors include at least one of a lighting condition, an air quality condition, a wind condition, and a weather condition.

8. The method of claim 1, further comprising:
categorizing, by the second autonomous vehicle, the valid promotion opportunity as an actual promotion opportunity when the second sensor data correspond to the valid promotion opportunity.

9. The method of claim 2, wherein the user input includes at least one of a touch input, a voice input, and a gesture.

10. The method of claim 1, further comprising:
selecting, by a device of the promotion participant, the promotion activity to be performed among a plurality of promotion activities available for selection.

11. The method of claim 1, further comprising:
transmitting, by the second autonomous vehicle to a promotion database server, one or more promotion contribution factor requirements; and labeling and storing, in the promotion database server, the one or more promotion contribution factor requirements.

12. The method of claim 1, wherein the promotion activity is determined to be the valid promotion opportunity when the first sensor data corresponds with the promotion requirements for the promotion activity.

13. The method of claim 1, wherein at least one of the first and second autonomous vehicles includes:
an image sensor,
a LIDAR (actuators, a light detection and ranging) sensor,
a radar sensor, and
a meteorological sensor.

14. The method of claim 1, wherein the providing of the generated promotion includes, displaying, on a display of the user interface, the generated promotion.

15. The method of claim 14, wherein the display is a transparent display.

16. The method of claim 2, wherein the providing of the generated promotion includes, displaying, on a display of the user interface, the generated promotion, and wherein, when the received user input is a movement of eyes of a passenger riding in the second autonomous vehicle to be in alignment with the display of the generated promotion, the promotion success server determines that the promotion activity is the successful promotion.

17. The method of claim 1, further comprising:
modifying the route of the second autonomous vehicle to pass by the promotion activity.

18. The method of claim 2, further comprising:
transmitting, from the promotion success server to a promotion compensation server, compensation data; and
rewarding the promotion participant based on the successful promotion.

19. A non-transitory computer readable storage medium that stores a computer program, the computer program, when executed by a processor, causing a computer apparatus to perform a process comprising:
extracting promotion requirements for a promotion activity;
collecting first sensor data of the promotion activity performed by a promotion participant on a route of a first autonomous vehicle;
determining, based on the promotion requirements and the first sensor data, whether the promotion activity for which the first sensor data is collected is a valid promotion opportunity;
transmitting, to a current promotion database server, details of the valid promotion opportunity and corresponding location information;
obtaining, from the current promotion database server, the details of the valid promotion opportunity;
when a second autonomous vehicle is determined to be traveling on a route passing by a location of the promotion activity, collecting second sensor data of the promotion activity performed by the promotion participant;
determining, based on the second sensor data and the details of the valid promotion opportunity, whether the second sensor data corresponds to the valid promotion opportunity;
when the second sensor data is determined to correspond to the valid promotion opportunity, generating a promotion; and
providing, to a user interface of the second autonomous vehicle, the generated promotion.

20. A computer apparatus for facilitating a dynamic promotion activity using autonomous vehicles, the computer apparatus comprising:
  a memory that stores instructions, and
  a processor that executes the instructions,
  wherein, when executed by the processor, the instructions cause the processor to perform operations comprising:
  extracting promotion requirements for a promotion activity;
  collecting first sensor data of the promotion activity performed by a promotion participant on a route of a first autonomous vehicle;
  determining, based on the promotion requirements and the first sensor data, whether the promotion activity for which the first sensor data is collected is a valid promotion opportunity;
  transmitting, to a current promotion database server, details of the valid promotion opportunity and corresponding location information;
  obtaining, from the current promotion database server, the details of the valid promotion opportunity;
  when a second autonomous vehicle is determined to be traveling on a route passing by a location of the promotion activity, collecting second sensor data of the promotion activity performed by the promotion participant;
  determining, based on the second sensor data and the details of the valid promotion opportunity, whether the second sensor data corresponds to the valid promotion opportunity;
  when the second sensor data is determined to correspond to the valid promotion opportunity, generating a promotion; and
  providing, to a user interface of the second autonomous vehicle, the generated promotion.

* * * * *